April 27, 1937.  K. E. SUMMERS  2,078,352
MEASURING INSTRUMENT
Filed July 21, 1936
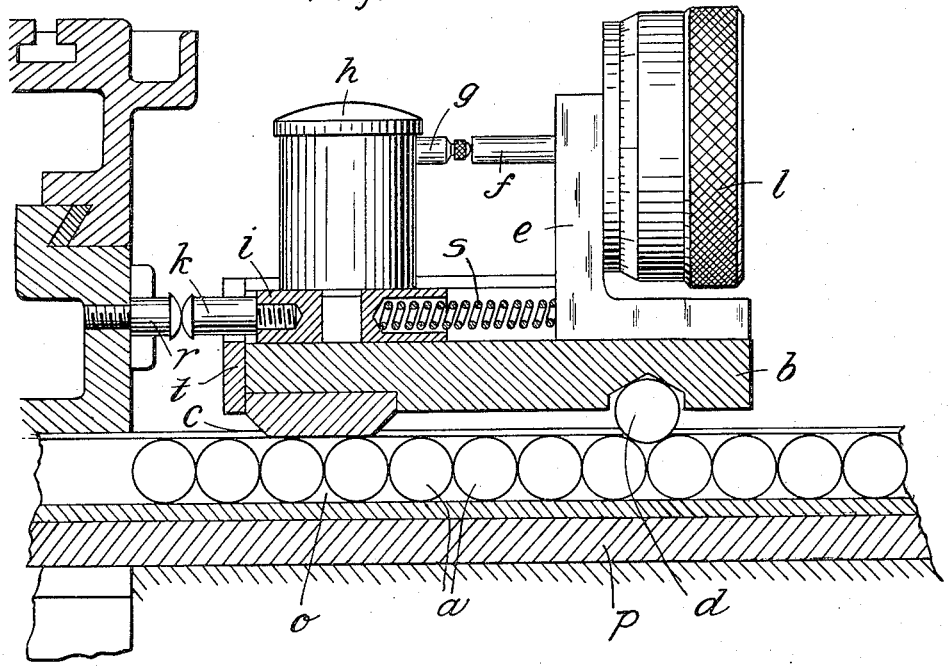
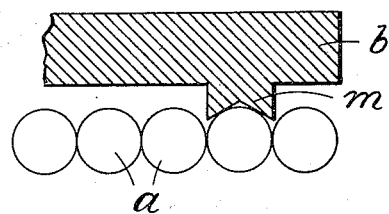
Inventor:
Kenneth Edward Summers Patented Apr. 27, 1937

2,078,352

UNITED STATES PATENT OFFICE 2,078,352

MEASURING INSTRUMENT

Kenneth Edward Summers, Old Fletton, Peterborough, England

Application July 21, 1936, Serial No. 91,653
In Great Britain December 18, 1934

4 Claims. (Cl. 33—125)

It has been proposed in connection with jig boring machines and the like to employ measuring elements in the form of micrometer gauges and dial indicators mounted on carriages which are positioned on a support by means of measuring blocks assembled in a row. In these known devices the position of the carriage is determined by a one-sided abutment of a screw or a detent against the blocks, and inaccuracies are likely to be incurred by more or less hard pressure against the blocks and by the interposition of particles of dust or the like between the assembled blocks.

The object of the present invention is to ensure greater accuracy in the measurements, and the invention consists essentially in the provision of means allowing the carriage to gravitate into different positions along a row of accurately manufactured supporting and spacing elements of circular cross-section representing units of measurement and operative to guide the carriage into its correct position.

The supporting and spacing elements may consist of balls or rollers which, as they merely make point or line contact with each other and with the bearing surfaces of the carriage under constant pressure and in directions which are oblique relative to the direction of adjustment of the carriage, will render the positioning of the latter independent of factors which, as explained above, might lead to inaccuracies.

Fig. 1 of the accompanying drawing represents a sectional side view of a device constructed according to the invention, and Fig. 2 is a fragmentary section showing a modified arrangement.

The illustrated device comprises a straight row of spacing pieces in the form of rollers $a$ mounted in a cradle $o$ in the bed $p$ of the boring or like machine. On said rollers a carriage $b$ is loosely supported at one end by a flat thrust member $c$ and at the other end by means of a thrust member adapted to co-operate with the spacing rollers $a$ for retaining the carriage in definite positions on its support. In the arrangement shown in Fig. 1, the positioning thrust member consists of an intermediate roller $d$ for engagement with which the carriage is formed with a recessed, V-shaped bearing surface. The roller $d$ tends by gravity to find its lowermost position in the notch between any pair of adjacent rollers $a$, and the carriage similarly tends to find its lowermost position on the roller $d$. Thus the carriage can only occupy definite positions on the support, and these positions are determined by the rollers $a$. All the latter are of unit diameter and are accurately manufactured, so that in shifting the carriage from one position into another, a definite unit distance is traversed.

Firmly secured to the carriage $b$ is a bracket $e$ which carries a micrometer head $i$ reading to 1/10,000. The measuring screw $f$ of the micrometer head serves as an abutment for a spring stud $g$ connected to a dial indicator $h$. The body of the latter is mounted on a slide $i$ which is guided on the carriage $b$ in a direction parallel to the row of rollers $a$ and which carries a measuring stop $k$. A compression spring $s$ separates the slide $i$ from the bracket $e$, and a forked plate $t$ guides the stop $k$ and limits the movement of the slide in outward direction.

The slide rest $q$ of the machine is fitted with a stud $r$ which is coaxial with the measuring stop $k$ when the instrument is placed on the rollers and which serves as an abutment for the stop.

Normally the micrometer head is set at zero, and the indicator is adjusted by means of the measuring stop $k$ against the measuring screw $f$ until the indicator hand is also at zero or in any other standard position. For instance, for moving an article secured to the slide rest $q$ through a given distance, the slide rest is first moved up against the stop $k$ and adjusted together with the latter until the indicator hand shows standard reading. Then the required distance is set up either by shifting the carriage or by rotating the micrometer head, or both, whereupon the slide rest is again moved up against the stop and adjusted together with the latter until the indicator hand again shows standard reading. The article will then have been moved through the required distance. As an example, it may be required to move the article through a distance of 8.9794 units of measurement. Then, after the slide rest has been moved up against the stop and adjusted until the indicator hand is, say, at zero, the carriage $b$ is moved through 8 roller spaces, whereupon the micrometer head is turned from zero to .9794. On the slide rest being then moved up and adjusted together with the stop $k$ until the indicator hand is restored to zero position, the article will have moved through a distance of 8.9794 units.

The device may be modified, for instance as shown in Fig. 2 where the V-shaped bearing surface of the carriage $b$ is formed on a rib $m$ which projects from the under surface of the carriage. In this case the intermediate roller $d$ is omitted, and the carriage is positioned by direct engagement of the rim $m$ with the rollers $a$.

Other modifications of the device may be effected within the scope of the invention as defined by the appended claims.

I claim:

1. A device for obtaining accurate linear measurements, comprising a carriage, a measuring stop mounted adjustably on said carriage, a micrometer gauge instrument mounted on the carriage for gauging the position on the latter of said stop, a support for said carriage comprising a row of accurately manufactured spacing pieces of circular cross-section representing units of measurement, said row being parallel to the direction of adjustment of the measuring stop, and a flat thrust member at one end of the carriage for bearing against the spacing pieces, the carriage having a V-shaped bearing surface at the opposite end operative by engagement with the spacing pieces to guide the carriage by gravity into definite positions on the support.

2. A device for obtaining accurate linear measurements, comprising a carriage, a measuring stop longitudinally adjustable on said carriage, a micrometer gauge instrument mounted on the carriage for gauging the position on the latter of said stop, a support for the carriage comprising a plurality of accurately manufactured rollers assembled in a row and representing units of measurement, the row being parallel to the direction of adjustment to the stop, and a flat thrust member at one end of the carriage for bearing against the rollers, the carriage having a V-shaped bearing surface at the opposite end operative by engagement with the rollers to guide the carriage by gravity into definite positions on the support.

3. A device for obtaining accurate linear measurements comprising a carriage, a measuring stop longitudinally adjustable on said carriage, a micrometer gauge instrument mounted on the carriage for gauging the position on the latter of the stop, a support for the carriage comprising a plurality of accurately manufactured spacing rollers assembled in a row parallel to the direction of adjustment of the stop and representing units of measurement, a flat thrust member at one end of the carriage for bearing against the spacing rollers, the carriage having a V-shaped bearing surface at the opposite end, and a roller interposed between said bearing surface and the spacing rollers and operative to guide the carriage by gravity into definite positions on the support.

4. A device for obtaining accurate linear measurements comprising a carriage, a measuring stop longitudinally adjustable on said carriage, a micrometer gauge instrument mounted on the carriage for gauging the position on the latter of said stop, a support for the carriage comprising a plurality of accurately manufactured spacing rollers assembled in a row parallel to the direction of adjustment of the stop and representing units of measurement, a flat thrust member at one end of the carriage for bearing against the rollers, and a thrust member at the other end of the carriage constructed to engage in the notches between the rollers and operative to guide the carriage by gravity into definite positions on the support.

KENNETH EDWARD SUMMERS.